(12) United States Patent
Suemitsu (10) Patent No.: US 9,769,064 B2
(45) Date of Patent: Sep. 19, 2017

(54) COMMUNICATION NODE, PACKET PROCESSING METHOD AND PROGRAM

(71) Applicant: NEC Corporation, Tokyo (JP)

(72) Inventor: Mariko Suemitsu, Tokyo (JP)

(73) Assignee: NEC CORPORATION, Tokyo (JP)

(*) Notice: Subject to any disclaimer, the term of this patent is extended or adjusted under 35 U.S.C. 154(b) by 4 days.

(21) Appl. No.: 14/380,717

(22) PCT Filed: Mar. 18, 2013

(86) PCT No.: PCT/JP2013/057640
§ 371 (c)(1),
(2) Date: Aug. 23, 2014

(87) PCT Pub. No.: WO2013/141200
PCT Pub. Date: Sep. 26, 2013

(65) Prior Publication Data
US 2015/0016450 A1    Jan. 15, 2015

(30) Foreign Application Priority Data

Mar. 19, 2012   (JP) ................................. 2012-062221

(51) Int. Cl.
*H04L 12/721* (2013.01)
*H04L 12/715* (2013.01)
*H04L 12/741* (2013.01)

(52) U.S. Cl.
CPC .............. *H04L 45/38* (2013.01); *H04L 45/54* (2013.01); *H04L 45/64* (2013.01); *H04L 45/745* (2013.01)

(58) Field of Classification Search
None
See application file for complete search history.

(56) References Cited

U.S. PATENT DOCUMENTS 6,215,765 B1* 4/2001 McAllister .............. H04L 45/10
370/217
2002/0146009 A1 10/2002 Gupta et al.
(Continued)

FOREIGN PATENT DOCUMENTS

JP   2011-55370 A    3/2011
RU   2 316 124 C2    1/2008
(Continued)

OTHER PUBLICATIONS

OpenFlow Switch Specification Version 1.1.0 Implemented (Wire Protocol 0x02) Feb. 28, 2011.*
(Continued)

*Primary Examiner* — Robert C Scheibel
*Assistant Examiner* — Ayanah George
(74) *Attorney, Agent, or Firm* — McGinn IP Law Group, PLLC.

(57) ABSTRACT

A communication node includes: one or more flow table(s) that stores a control information item(s) as set by a controller; and a packet processing unit that searches for a control information item, having a match condition matching a received packet, from the one or more flow table(s), and processes the received packet in accordance with the control information item. In a case where a preset loop instruction is added in the control information item having the match condition matching the received packet, the packet processing unit performs a preset number of times of search for another control information item in the one or more flow table(s) and execution of the searched control information item.

19 Claims, 5 Drawing Sheets

(56) References Cited

U.S. PATENT DOCUMENTS

| | | |
|---|---|---|
| 2004/0034716 A1 | 2/2004 | Sundarraj et al. |
| 2007/0160052 A1 | 7/2007 | Okada |
| 2007/0201462 A1 | 8/2007 | Ilan |
| 2009/0316700 A1 | 12/2009 | White et al. |
| 2013/0170495 A1 | 7/2013 | Suzuki et al. |

FOREIGN PATENT DOCUMENTS

| | | |
|---|---|---|
| RU | 2 364 040 C2 | 8/2009 |
| WO | WO 2008/095010 A1 | 8/2008 |
| WO | WO 2012/032864 A1 | 3/2012 |

OTHER PUBLICATIONS

International Search Report dated Jun. 4, 2013 in International Patent Application Publication No. PCT/JP2013/057640.
Nick McKeown and seven others: "OpenFlow: Enabling Innovation in Campus Networks," [online], [Retrieved on Feb. 14, 2012], Internet <URL: http://www.openflow.org/documents/openflow-wp-latest.pdf>.
"OpenFlow Switch Specification," Version 1.1.0 Implemented (Wire Protocol 0x02), [online], [Retrieved on Feb. 14, 2012], Internet <URL: http://www.openflow.org/documents/openflow-spec-v1.1.0.pdf>.
European Search Report dated Oct. 21, 2015.
"OpenFlow Switch Specification", Dec. 5, 2011 (Dec. 5, 2011), XP055177510, Retrieved from the Internet: URL: https://www.opennetworking.org/images/stories/downloads/sdn-resources/onf-specifications/openflow/openflow-spec-v1.2.pdf.
Russian Office Action dated Dec. 18, 2015 with an English translation thereof.

\* cited by examiner

COMMUNICATION NODE, PACKET PROCESSING METHOD AND PROGRAM

REFERENCE TO RELATED APPLICATION

The present application claims priority from Japanese Patent Application 2012-062221 (filed on Mar. 19, 2012), the content of which is hereby incorporated in its entirety by reference into this specification.

The present invention relates to a communication node, a packet processing method and a program and, more particularly, to a communication node, which is run in operation based on the control information as set from a controller, a packet processing method and a program.

BACKGROUND

Field

Recently, a technique known as OpenFlow has been proposed (see Patent Literature (PTL) 1 and Non Patent Literatures (NPLs) 1 and 2). The OpenFlow grasps communication as an end-to-end flow and performs path control, load balancing and load optimization on the flow-by-flow basis. An OpenFlow switch, operating as relay equipment, includes a secure channel for communication with an Open-Flow controller, designed to operate as a controller, and is run in operation in accordance with a flow table(s) controlled as to addition or rewrite from the OpenFlow controller. In the flow tables, there is defined, per flow, a matching rule(s) or a header field(s) to match a packet header against, flow statistic information or Counter(s) and an instruction(s) stating processing contents applied to packets matching the matching rule(s) or the header field(s) (see "4.1 Flow Table" ff. of Non Patent Literature 2).

For example, on receipt of a packet, the OpenFlow switch searches for an entry having the matching rule(s) matching the header information of the received packet from the flow table. If, as a result of the retrieval, the entry matching the received packet has been found, the OpenFlow switch updates the flow statistic information (Counters), at the same time as it performs, in connection with the received packet, the processing contents stated in the action field of the entry in question, such as, for example, packet transmission from a port specified, flooding or dropping. Conversely, if no entry matching the received packet has been found by the above search, the OpenFlow switch forwards the received packet over the secure channel to the OpenFlow controller to request it to decide a path for the received packet based on the source and the destination of transmission of the received packet. The OpenFlow switch receives a flow entry that will enable deciding the packet path to update its flow table. In this manner, the OpenFlow switch forwards the packet, using the entry stored in the flow table as a processing rule.

In "4.1.1 Pipeline Processing" of Non Patent Literature 2, referred to below as "pipeline processing," mention is made that an OpenFlow switch has to support multi-stage search processing using a plurality of flow tables. According to the Non Patent Literature 2, processing consisting of (1) searching, from among the entries in an i'th table (i=0 to n) matching the received packet, for such entry having the highest priority, (2) updating the instruction(s) of the entry (changing a packet, updating a match field or updating an action set (see "4.7 Action Set" of Non Patent Literature 2) and updating metadata) and (3) sending match data and the action set to the next table, is repeatedly performed in the pipeline processing. Finally, the contents of the action set are executed (see FIG. 2 of Non Patent Literature 2).

PTL 1:
International Publication No. WO 2008/095010
NPL 1:
Nick McKeown and seven others: "OpenFlow: Enabling Innovation in Campus Networks," [online], [Retrieved on Feb. 14, 2012], Internet <URL: http://www.openflow.org/documents/openflow-wp-latest.pdf.
NPL 2:
"OpenFlow Switch Specification," Version 1.1.0 Implemented (Wire Protocol 0x02), [online], [Retrieved on Feb. 14, 2012], Internet <URL: http://www.openflow.org/documents/openflow-spec-v1.1.0.pd.

SUMMARY

The following analysis is given by the present invention. With the use of the above pipeline processing, it is possible to perform a plurality of different processing operations per received packet by, for example, directly outputting the received packet unchanged, modifying (by rewriting) the header of the packet received, again searching the flow table and performing a different processing operation(s).

Figure 5:
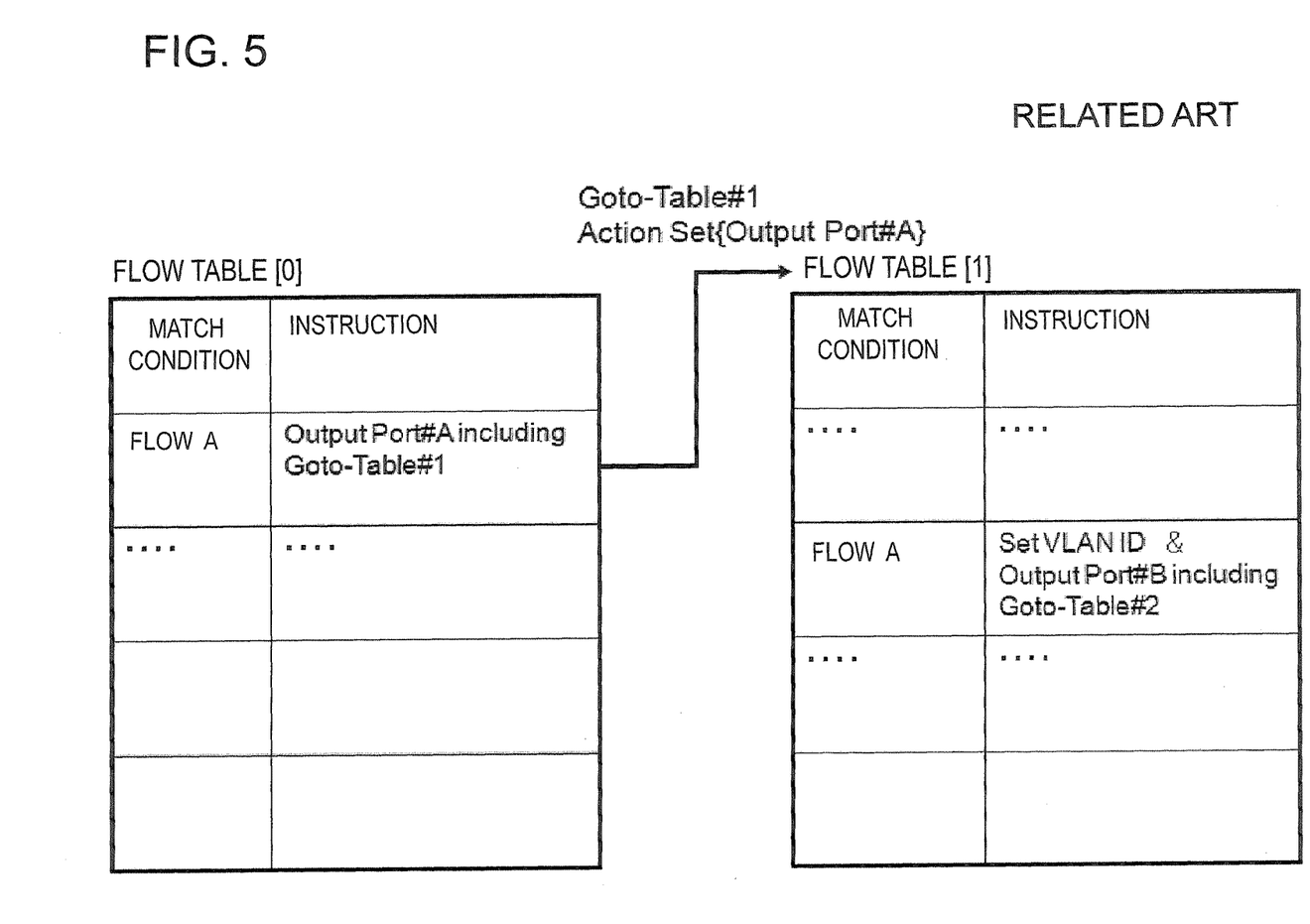
FIG. 5 is a schematic view for illustrating the flow table search processing in the OpenFlow switch according to Non Patent Literatures 1 and 2.

However, in the pipeline processing of Non Patent Literature 2, if the table to be searched is to be changed, the flow table to be now searched must be the flow table the table ID of which is greater than that of the currently referenced flow table, as stated in "4.6 Instructions" paragraph "Goto-Table" (see FIG. 5). Thus, if different operations are to be applied to a single packet received, the number of the flow tables to be retained by each OpenFlow switch is undesirably increased.

Therefore, there is a need in the art to provide a communication node, operating in accordance with the control information as set or configured from a controller represented by the above mentioned OpenFlow, according to which different operations may be applied using a smaller number of the flow tables.

According to a first aspect of the present invention, there is provided a communication node, comprising: one or more flow table(s) that stores a control information item(s) as set by a controller; and a packet processing unit that searches for a control information item, having a match condition matching a received packet, from the one or more flow table(s), and processes the received packet in accordance with the control information item. In a case where a preset loop instruction is added in the control information item having the match condition matching the received packet, the packet processing unit performs a preset number of times of search for another control information item in the one or more flow table(s) and execution of the searched control information item.

According to a second aspect of the present invention, there is provided a communication system, comprising: a communication node; and a controller. The communication node comprises: a plurality of flow tables that store control information item(s); and a packet processing unit that selects the plurality of flow tables in a preset order, searches for a control information item having a match condition matching a received packet, and processes the received packet in accordance with the control information item. In a case where a preset loop instruction is added in the control information item having the match condition matching the received packet, the communication node performs a preset number of times of search for another control information item in the plurality of flow tables and execution of the searched control information item. The controller sets in the plurality of flow tables of the communication node a plurality of control information item(s) including a control information item to which the preset loop instruction is added.

According to a third aspect of the present invention, there is provided a packet processing method by a communication node that comprises one or more flow table(s) that stores control information item(s) as set by a controller, and a packet processing unit that searches for a control information item, having a match condition matching a received packet, from the one or more flow table(s), and processes the received packet in accordance with the control information item. The packet processing method comprises: checking whether a preset loop instruction is added in the control information item having the match condition matching the received packet; and performing a preset number of times of search for another control information item in the one or more flow table(s) and execution of the searched control information item in a case where the preset loop instruction is added in the control information item having the match condition matching the received packet. The present method is bound up with a particular machine in the form of a communication node run in operation by the control information configured from the controller.

According to a fourth aspect of the present invention, there is provided a program, causing a computer, mounted on board a communication node that comprises one or more flow table(s) that stores control information item(s) as set by a controller, and a packet processing unit that searches for a control information item, having a match condition matching a received packet, from the one or more flow table(s), and processes the received packet in accordance with the control information item, to execute: checking whether a preset loop instruction is added in the control information item having the match condition matching the received packet; and performing a preset number of times of search for another control information item in the one or more flow table(s) and execution of the searched control information item in a case where the preset loop instruction is added in the control information item having the match condition matching the received packet. It is observed that the present program can be recorded in a computer-readable, that is, non-transient, recording medium. That is, the present invention may be implemented as a computer program product.

The present invention provides the following advantage, but not restricted thereto. According to the present invention, a communication node, run in operation in accordance with the control information, configured from a controller, may be made to perform different processing operations despite using a smaller number of flow tables.

PREFERRED MODES

In the present disclosure, there are various possible modes, which include the following. but not restricted thereto. It is noted that symbols for reference to the drawings added in the following description are merely for assisting the understanding and are not intended to limit the invention to the modes illustrated.

Figure 1:
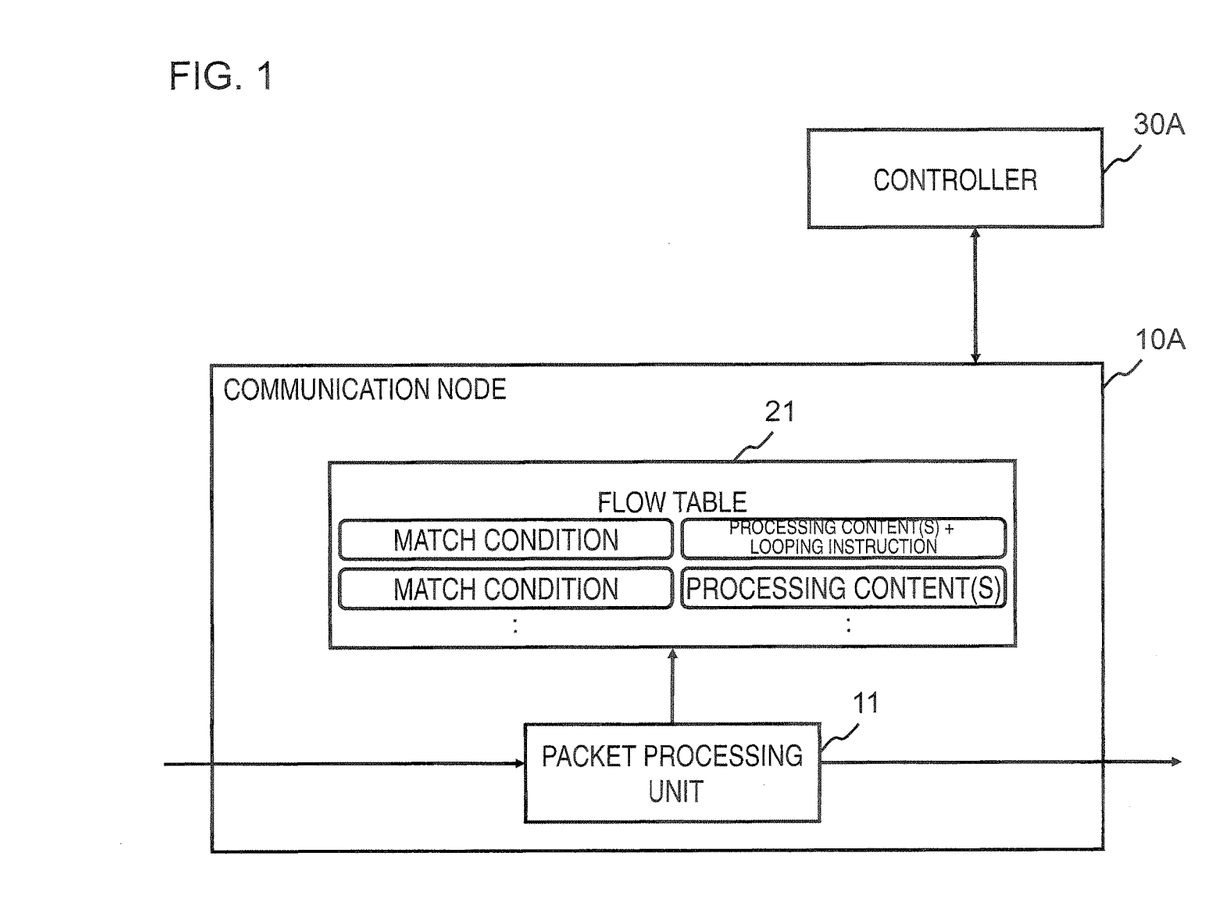
FIG. 1 is a schematic block diagram showing a configuration of a first exemplary embodiment of the present invention.

In one mode of the present invention, a communication node 10A includes one or more flow table(s) 21 that stores control information item(s) as set from a controller 30A, and a packet processing unit 11, as shown in FIG. 1. The packet processing unit searches for a control information item having a match condition matching a received packet, from the one or more flow table(s), and processes the packet in accordance with the control information item.

In more detail, if a preset loop instruction is added in the control information item having the match condition matching the received packet, the communication node 10A performs a preset number of times of search for another control information item in the flow table(s) 21 and execution of the searched control information item. For example, on receipt of the packet matching a flow entry in an uppermost field of the flow table 21 of FIG. 1, the communication node 10A executes the processing contents of the flow entry, searches for another control information item and executes the so searched control information. In this manner, the flow entry (entries) in a lower field(s) of the flow table 21 of FIG. 1 can be searched and corresponding processed contents executed.

A plurality of different processing operations may thus be executed in at least one flow table. It is observed that the number of times the other item(s) of the control information is searched and the so searched control information item(s) is executed (the number of times of loop) may be predetermined at the outset or alternatively specified by a parameter in the preset loop instruction.

First Exemplary Embodiment

Figure 2:
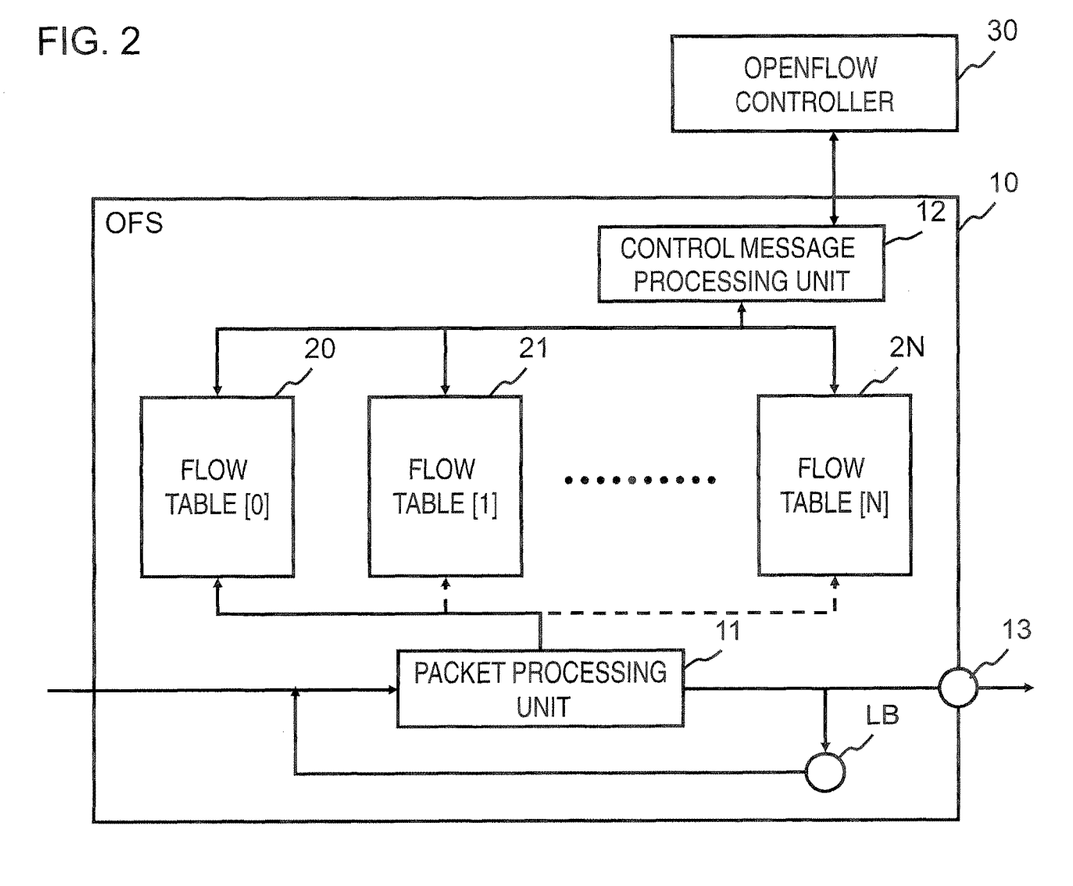
FIG. 2 is a schematic block diagram showing a configuration of an OpenFlow switch according to the first exemplary embodiment of the present invention.

A first exemplary embodiment of the present invention will now be explained in detail with reference to the drawings. FIG. 2 shows a configuration of an OpenFlow switch, also expressed below as OFS, according to the first exemplary embodiment of the present invention. Referring to FIG. 2, there is shown an arrangement made up of the packet processing unit 11, a control message processing unit 12, a plurality (N+1) of flow tables 20 to 2N, an output interface 13 and a loopback interface LB.

A plurality of table IDs of from 0 to N, used for indicating the search order, is donated to the flow tables 20 to 2N.

On receipt of a packet, the packet processing unit 11 selects the flow tables 20 to 2N, in the order of their table IDs, so as to search for a flow entry having a match condition matching the received packet. If, as a result of search for a certain one of the flow tables, excluding the flow table 2N, no flow entry having the match condition matching the received packet has been found, the packet processing unit 11 selects the flow table(s) having sequentially next greater table ID(s) to search for the flow entry (entries) having the match condition(s) matching the received packet. If, as a result of search in the last flow table 2N, no flow entry having the match condition matching the received packet is found, the packet processing unit 11 performs a preset processing operation (no-match action). The preset no-match action may be an action of discarding the received packet (Drop), notifying packet reception to an OpenFlow controller 30 via the control message processing unit 12 (Packet-In), and so forth.

Conversely, if, as the result of the search in the flow tables 21 to 2N, such flow entry having the match condition matching the received packet has been found, the packet processing unit 11 processes the received packet in accordance with the contents of the instruction field of the flow entry. Additionally, should a Goto-Table action be added in the processing contents of the instruction field, the packet processing unit 11 selects the flow table specified in the Goto-Table action to continue with searching for a flow entry (entries) having the match condition matching the received packet.

The control message processing unit 12 accepts the operations of setting, changing or removing a flow entry (entries) of the flow tables 21 to 2N from the OpenFlow controller 30, which OpenFlow controller is equivalent to the above mentioned controller 30A. The control message processing unit 12 also sends a packet reception notification (Packet-In) to the OpenFlow controller 30 in response to a request from the packet processing unit 11. Such communication between the OFS 10 and the OpenFlow controller 30 may be carried out using the OpenFlow Protocol according to Non Patent Literature 2.

The output interface 13 is made up by, for example, physical ports connected to other OFSes 10 or terminals. For example, if the contents of the instruction field of a flow entry is to forward the packet (Output), the packet is forwarded from the output interface 13. Although the sole output interface 13 is shown in the exemplary embodiment of FIG. 2, there may also be provided a plurality of the output interfaces 13.

The loopback interface LB is an interface used as a forwarding destination in a case where the Goto-Table action is added in the processing contents of the instruction field and the flow table specified by the Goto-Table action is the flow table of the table ID=0. When a packet is output from an output end of the loopback interface LB, the packet processing unit 11 commences searching the flow table 20 in the same way as when a packet is received.

It is noted that various parts (processing means) of the OFS 10, shown in FIG. 2, can be implemented by a computer program which enables a computer composing the OFS 10 to carry out the above mentioned processing operations using the computer's hardware.

Figure 3:
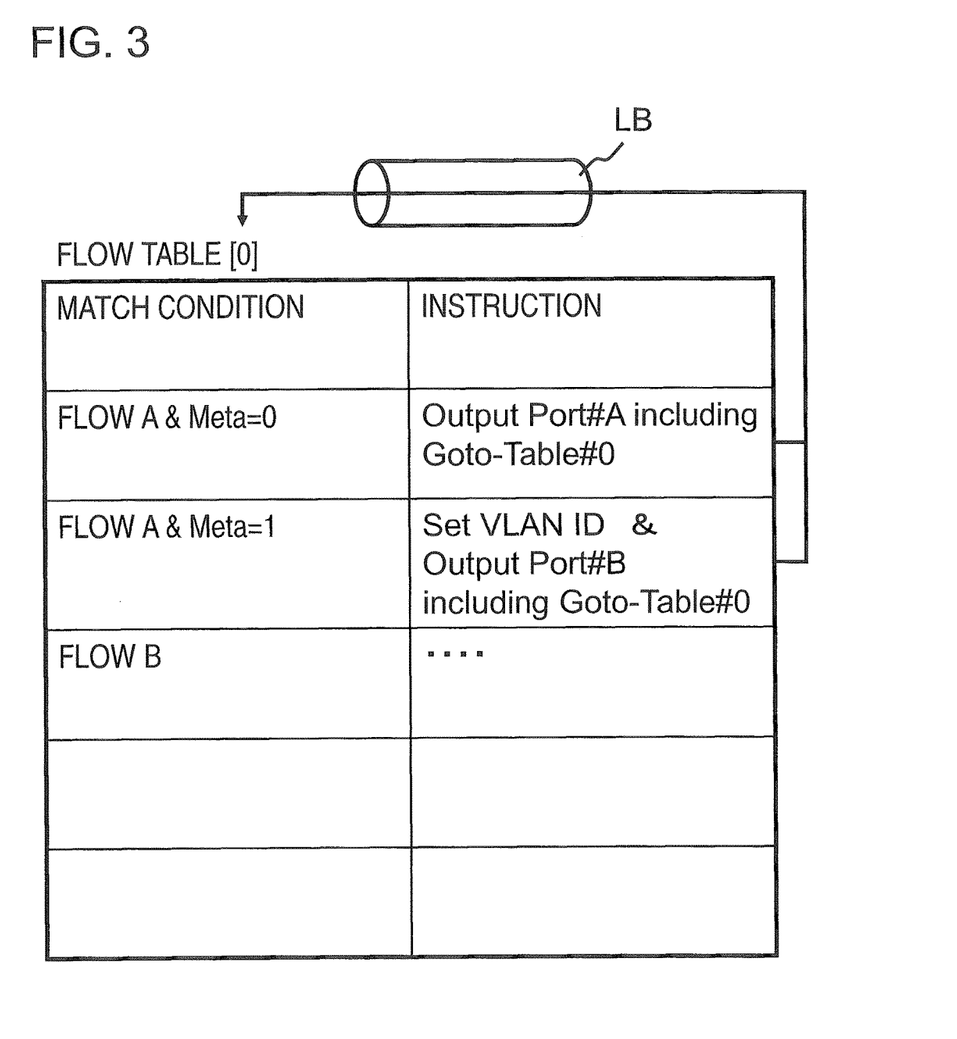
FIG. 3 is a schematic view showing flow entries configured in the OpenFlow switch according to the first exemplary embodiment of the present invention as well as processing contents therefor.

FIG. 3 depicts a table illustrating a plurality of flow entries configured in a flow table and corresponding processing contents. In the exemplary embodiment of FIG. 3, if a packet which belongs to a flow A and whose metadata field has a value of 0 is received, flow entry hit occurs at a flow entry of "Flow A & Meta=0." It is observed that, as for the flow A, communication between particular hosts is grasped as a flow and the combination of the address of transmission source and that of the host of the transmission destination in the packet header is specified. As for the metadata field, reference may be made to Non Patent Literature 2, "4.3 Match Fields" and Table 3 "Metadata." In the above case, the processing of outputting the received packet at the output interface 13 is carried out (Output Port #A). Since the Goto-Table action that specifies the flow table with the Table-ID=0 (Goto-Table #0) is added in this flow entry, reversion is made to the flow table having the Table ID=0 in order to search for the flow entry matching the received packet again. At this time, the packet processing unit 11 increments the value of the metadata field of the received packet by one.

In the next or second flow table search, the flow entry matching the packet which belongs to the flow A and whose metadata field has a value of 1 is searched. As a result, flow entry hit occurs at the flow entry of "Flow A & Meta=1." In this case, the VLAN ID (Virtual Local Area Network ID) of the received packet is changed, by rewrite, and the packet is output from the output interface 13 (Output port #B). Since the Goto-Table #0 is added as the Goto-Table action, reversion is made to the flow table having the Table ID=0 in order to search again for the flow entry matching the received packet. The packet processing unit 11 increments the value of the metadata field of the received packet by one in this case again.

If, as the result of the second table search, flow table hit has occurred, processing is carried out in accordance with the contents of the instruction field in the flow entry that has so hit. This processing may be enumerated by packet forwarding, header change (by rewrite) and, if need be, search in the flow table specified.

Figure 4:
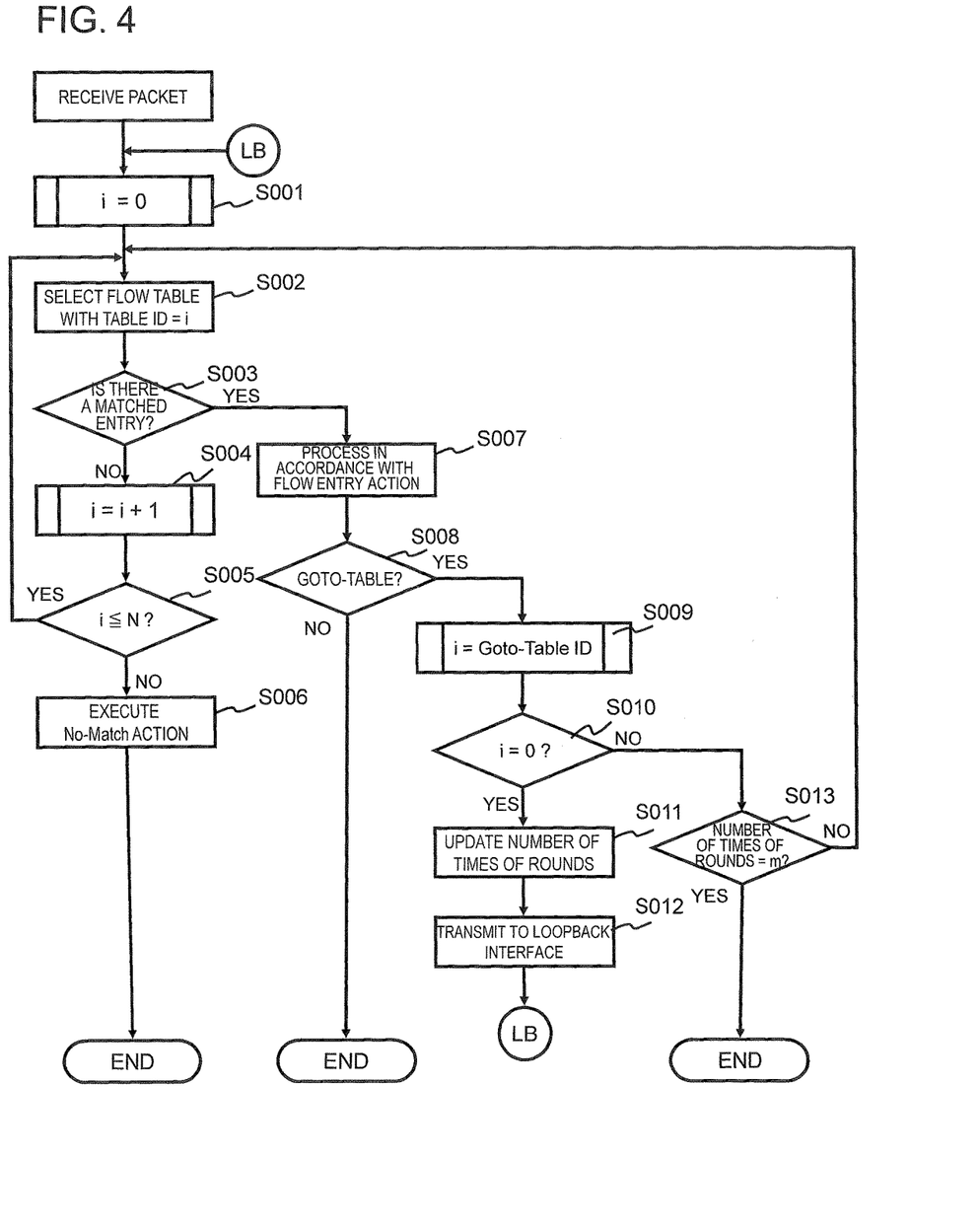
FIG. 4 is a flowchart showing the progress of processing at the time of packet reception in the OpenFlow switch according to the first exemplary embodiment of the present invention.

An operation of the subject exemplary embodiment will now be explained in detail with reference to the drawings. FIG. 4 depicts a flowchart showing the progress of the processing in the OpenFlow switch of the first exemplary embodiment of the present invention.

Referring to FIG. 4, the OFS 10 selects, on receipt of a packet, a flow table having the smallest table ID value, and searches for a flow entry having a match condition matching the received packet (steps S01 to S003).

If, as a result of the above search, no flow entry matching the received packet has been found (No of the step S003), the OFS 10 increments the variable i by one and proceeds to searching in the flow table of the next table ID (step S004 and Yes of the step S005). If, after searching in the total of the flow tables, no flow entry matching the received packet is found (No of the step S005), the OFS 10 executes a preset no-match action (step S006).

On the other hand, if the flow entry matching the received packet is found in the step S003 (Yes of the step S003), the OFS 10 proceeds to the following processing operations.

First, the OFS 10 performs processing operations in accordance with the action of the instruction field of the flow entry that has met a hit in the search operation in the step S003 (step S007; see "4.6 Instructions" of Non Patent Literature 2).

The processing on the received packet by the OFS 10 comes to a close in a case where there is no Goto-Table action among the actions of the instruction field (No of the step S008).

If conversely there is a Goto-Table action among the actions in the instruction field (Yes of the step S008), the OFS 10 checks to see whether or not the table ID specified in the Goto-Table action is zero (steps S009 and S010). In a case where the table ID specified by the Goto-Table action is zero, that is, if there is added a loop instruction, the OFS 10 increments the value of the metadata field of the received packet (number of times of round operations) by one (step S011) and transmits the result to the loopback interface (step S012 to terminal LB).

If conversely the value of the table ID in the Goto-Table action checked in the step S010 is not zero, the OFS 10 checks to see whether or not the value of the metadata field of the received packet (number of times of rounds) is a preset threshold value m (step S013). If the value of the metadata field (number of times of rounds) is the preset threshold value m (Yes of the step S013), the processing for the received packet comes to a close. It is noted that the preset threshold value m may be a value determined at the outset or may be specified by a supplementary parameter of the above mentioned Goto-Table action).

If, in the step S013, the value of the metadata field (number of times of rounds) is less than the preset threshold value m (No of the step S013), the OFS 10 selects the flow table of the table ID specified by the Goto-Table action, and continues with the search for the flow entry having the match conditions matching the received packet.

In the subject exemplary embodiment, iterative search operations may be conducted for the same flow table, as described above. It is thus possible to conduct different operations using a smaller number of flow tables. Moreover, in the subject exemplary embodiment, in which the number of times of the rounds is written in the metadata field of the received packet, the number of research operations can be managed. In addition, the so written number of times of the rounds is also be used as the match conditions. It is thus possible not only to avoid iterating the same flow entry but also to switch processing contents applied for a packet depending on the number of times of search operations.

The above described exemplary embodiment of the present invention is not to be construed as limiting the invention, such that further changes, substitutions and adjustments may be conducted within the scope not departing from the basic technical concept of the invention. For example, although it is presupposed in the above described exemplary embodiment that the arrangement based on the OpenFlow of Non Patent Literatures 1 and 2 is to be used, the present invention may also apply to centralized control configuration communication systems having comparable structures.

Also, in the above described exemplary embodiment, it is presupposed that the loop operation is to be conducted in the case that the value of the table ID specified in the Goto-Table Action is zero. It is however also possible to perform similar processing even in such case that the value of the table ID specified in the Goto-Table Action is different from zero.

In the above described exemplary embodiment, it is also presupposed that the number of times of the rounds is stated in the metadata field of the received packet so as to manage the number of times of search operations in the flow tables. It is however also possible to manage the number of times of search operations (number of times of loop operations) within the packet processing unit 11. In such case, the number of times of search operation may be incremented at the time of collation to an optional flow entry (entries). In such case, the processing contents applied for a packet may be changed depending on the number of times of the search operations, in the same way as in the above first exemplary embodiment.

In the above exemplary embodiment, not only the flow information but also the metadata field of the received packet is used as the match condition. It is however also possible to add the port information corresponding to the above mentioned loopback interface (In-port) into the match condition(s).

Moreover, in the above described exemplary embodiment, it is presupposed that the OFS of Non Patent Literature 2 is used as typical of the communication nodes. It is however possible to use equipment other than the OFS as the communication node provided that such other equipment used has the function to search one or more flow tables for a flow entry (entries) matching the received packet or a packet from a stored application (s), and process the so searched flow entry (entries). Examples of such other equipment include mobile phone terminals, smartphones, tablet terminals, personal computers, game equipment or mobile routers, given that these have the switching function to send/receive packets to or from the stored application(s).

The disclosures of the above mentioned Patent and Non Patent Literatures are to be incorporated herein by reference. The particular exemplary embodiment or Example may be modified or adjusted within the gamut of the entire disclosure of the present invention, inclusive of claims, based on the fundamental technical concept of the invention. Moreover, a variety of combinations or selection of elements herein disclosed (elements of claims, exemplary embodiment, Example and drawings) may be made within the concept of the claims of the present invention. Viz., it is to be understood that the present invention may include a diversity of changes or corrections that may occur to those skilled in the art in accordance with the total disclosures inclusive of the claims and the drawings as well as the technical concept of the invention.

REFERENCE SIGNS LIST

10 OpenFlow switch (OFS)
10A communication node
11 packet processing unit
12 control message processing unit
13 output interface
20 to 2N flow table
30 OpenFlow controller
30A controller
LB loopback interface

What is claimed is:

1. A communication node, comprising:
one or more flow table(s) that stores a control information item(s) as set by a controller; and
a packet processor that is configured to search for a control information item, having a match condition matching a received packet, from the one or more flow table(s), and processes the received packet in accordance with the control information item,
wherein, in a case where a preset loop instruction that instructs the communication node to perform a preset number of times of search within the one or more flow table(s) is added in the control information item having the match condition matching the received packet, the packet processor is further configured to perform the preset number of times of search for another control information item in the one or more flow table(s) and execution of the searched control information item.

2. The communication node according to claim 1, wherein, the communication node comprises a plurality of flow tables having a preset search order,
wherein, in a case where the preset loop instruction is added in the control information item having the match condition matching the received packet, the packet processor is further configured to perform a preset number of times of round search for another control information item in accordance with the preset search order with a flow table indicated in the loop instruction as a start point.

3. The communication node according to claim 1, wherein a number of times of the search for another control information item and execution of the searched control information item or a number of times of a round search is specified by a parameter in the preset loop instruction.

4. The communication node according to claim 1, wherein the packet processor is further configured to insert a number of times of execution of search for the one or more flow table(s) in a meta information field of the received packet to manage the number of times of the search for another control information item or a number of times of the round search.

5. The communication node according to claim 4, wherein the meta information field of the received packet, in which the number of times of execution of search for the one or more flow table(s) is inserted, is used as the match condition.

6. The communication node according to claim 1, wherein the packet processor is further configured to forward the received packet to a preset loopback interface and receives the forwarded packet from the loopback interface to perform search for another control information item repeatedly.

7. The communication node according to claim 6, wherein whether or not a packet in question is one received from a port allocated as the loopback interface is set as the match condition.

8. A communication system, comprising:
a communication node; and
a controller,
wherein the communication node comprises:
  a plurality of flow tables that store control information item(s); and
  a packet processor that is configured to search the plurality of flow tables in a preset order, searches for a control information item having a match condition matching a received packet, and processes the received packet in accordance with the control information item,
wherein, in a case where a preset loop instruction that instructs the communication node to perform a preset number of times of search within the one or more flow table(s) is added in the control information item having the match condition matching the received packet, the communication node performing the preset number of times of search for another control information item in the plurality of flow tables and execution of the searched control information item, and
wherein the controller sets in the plurality of flow tables of the communication node a plurality of control information item(s) including a control information item to which the preset loop instruction is added.

9. A packet processing method, comprising:
by a communication node that comprises one or more flow table(s) that stores control information item(s) as set by a controller, and a packet processor that is configured to search for a control information item, having a match condition matching a received packet, from the one or more flow table(s), and processes the received packet in accordance with the control information item,
checking whether a preset loop instruction is added in the control information item having the match condition matching the received packet; and
performing a preset number of times of search for another control information item in the one or more flow table(s) and execution of the searched control information item in a case where the preset loop instruction that instructs the communication node to perform the preset number of times of search within the one or more flow table(s) is added in the control information item having the match condition matching the received packet.

10. The communication node according to claim 2, wherein a number of times of the search for another control information item and execution of the searched control information item or a number of times of the round search is specified by a parameter in the preset loop instruction.

11. The communication node according to claim 2, wherein the packet processor is further configured to insert a number of times of execution of search for the one or more flow table(s) in a meta information field of the received packet to manage the number of times of the search for another control information item or the number of times of the round search.

12. The communication node according to claim 1, wherein the packet processor performs repetition of searches in the preset number of times of search for said another control information item in the one or more flow table(s).

13. The communication node according to claim 12, wherein said repetition of searches comprises a loop processing.

14. The communication node according to claim 13, wherein the communication node comprises a single communication node, the packet processor performing the preset number of times of search for said another control information item in the one or more flow table(s) in the single communication node.

15. The communication node according to claim 1, wherein the communication node comprises a single communication node, the packet processor performing a loop processing in said performing the preset number of times of search for said another control information item in the one or more flow table(s) in the single communication node.

16. The communication system according to claim 8, wherein the communication node performs repetition of searches in the preset number of times of search for said another control information item in the flow tables.

17. The communication system according to claim 16, wherein said repetition of searches comprises a loop processing.

18. The communication system according to claim 17, wherein the communication node comprises a single communication node that performs the preset number of times of search for said another control information item in the flow tables.

19. The communication system according to claim 8, wherein the communication node comprises a single communication node that performs a loop processing in said performing the preset number of times of search for said another control information item in the flow tables.

* * * * *